(12) United States Patent
Hsu

(10) Patent No.: US 6,437,470 B1
(45) Date of Patent: Aug. 20, 2002

(54) DRUM-TYPE MOTOR WITH INNER GEAR

(76) Inventor: Chun-pu Hsu, No. 19, Wu Chuang Liu Rd., Wu Ku Industrial Park, Taipei Hsien (TW)

( * ) Notice: Subject to any disclaimer, the term of this patent is extended or adjusted under 35 U.S.C. 154(b) by 0 days.

(21) Appl. No.: 09/785,280

(22) Filed: Feb. 20, 2001

(51) Int. Cl.⁷ .................................................. H02K 7/10
(52) U.S. Cl. ................. 310/75 R; 310/67 A; 310/75 C; 310/83; 310/99
(58) Field of Search ............................ 310/75 R, 67 A, 310/83, 75 C, 96, 98, 99; 180/65.5, 65.6

(56) References Cited

U.S. PATENT DOCUMENTS

| | | | | |
|---|---|---|---|---|
| 3,897,843 A | * | 8/1975 | Hapenman et al. | 310/67 R |
| 4,260,919 A | * | 4/1981 | Fleming | 310/113 |
| 4,274,023 A | * | 6/1981 | Lamprey | 310/83 |
| 6,104,112 A | * | 8/2000 | Vanjani | 310/64 |
| 6,157,105 A | * | 12/2000 | Kuragaki et al. | 310/75 R |
| 6,276,475 B1 | * | 8/2001 | Nakanasono | 180/65.8 |

* cited by examiner

Primary Examiner—Nestor Ramirez
Assistant Examiner—Thanh Lam
(74) Attorney, Agent, or Firm—Rosenberg, Klein & Lee

(57) ABSTRACT

A drum-type motor combines planet gear and spindle motor. The planet gear is arranged on lateral side of the spindle motor and the axis of the spindle motor is functioned as sun gear. The drum-type motor of the present invention has an inner gear engaged with the planet gear. The inner gear and the sun gear have such tooth ratio that the drum-type motor of the present invention has high torque at low rotation speed.

7 Claims, 7 Drawing Sheets

DRUM-TYPE MOTOR WITH INNER GEAR

FIELD OF THE INVENTION

The present invention relates to a drum-type motor, especially to a drum-type motor with inner gear, which has high efficiency and provides high torque output at low rotation speed

BACKGROUND OF THE INVENTION

The conventional outer-rotor drum-type motor 51, as shown in FIG. 7, comprises a stator 511, an outer rotor magnet 512, a magnet shell 513, two side plates 514, a spindle 315 and a motor casing 415. In this conventional outer-rotor drum-type motor 51, the drum of the motor is directly driven by the outer rotor for operation. However, when the drum-type motor is operated in low rotation speed condition such as electrical bicycle, the motor output power of the motor is proportional to the motor rotation speed with reference to the formula:

$$T=P/N=A \cdot B \cdot L \cdot D^2 \cdot 6.1 \times 10^8$$

Wherein

T: motor torque (N/cm)

N: motor rotation speed (rpm)

B: magnetic flux density

D: outer radius of rotor (cm)

P: output power (Watt)

A: current density (Amp/cm)

L: length of rotor (cm)

As can be seen from above formula, the power (P) of the motor is low when the motor is operated at low rotation speed and fixed outer rotor radius. To increase the motor output power at low rotor rotation speed, the current density (A) and the magnetic flux density (B) should be increased. However, this imposes a serious problem to the mechanical structure of the motor. To increase the current density (A), the thickness and turn number of the coils should be increased. However, the coils generally occupy a specific area ration on the winding groove of the rotor.

To overcome above problems, the present invention provides a drum-type motor combining planet gear and spindle motor. The planet gear is arranged on lateral side of the spindle motor and the axis of the spindle motor is functioned as sun gear. The drum-type motor of the present invention has an inner gear engaged with the planet gear. The inner gear and the sun gear have such tooth ratio that the drum-type motor of the present invention has high torque at low rotation speed.

SUMMARY OF THE INVENTION

The present invention is intended to provide a drum-type motor, which has high efficiency and provides high torque output at low rotation speed. The dissipated power of the motor is as follow:

$$W=I_2 R$$

W: dissipated power of the motor (Watt)

I: current (Amp)

R: copper resistance of coil (Ω)

As can be seen from above formula, the output power of the motor depends on the operation current (I) and the copper resistance (Ω) of coil. If the motor can provide sufficient torque at low operation current (I), the motor should have low copper resistance of coil and high operational efficiency. Therefore, the drum-type motor is designed to operate at low rotation speed and high torque with high rotation speed and high efficiency.

The various objects and advantages of the present invention will be more readily understood from the following detailed description when read in conjunction with the appended drawing, in which:

DETAILED DESCRIPTION OF THE INVENTION

Figure 1:
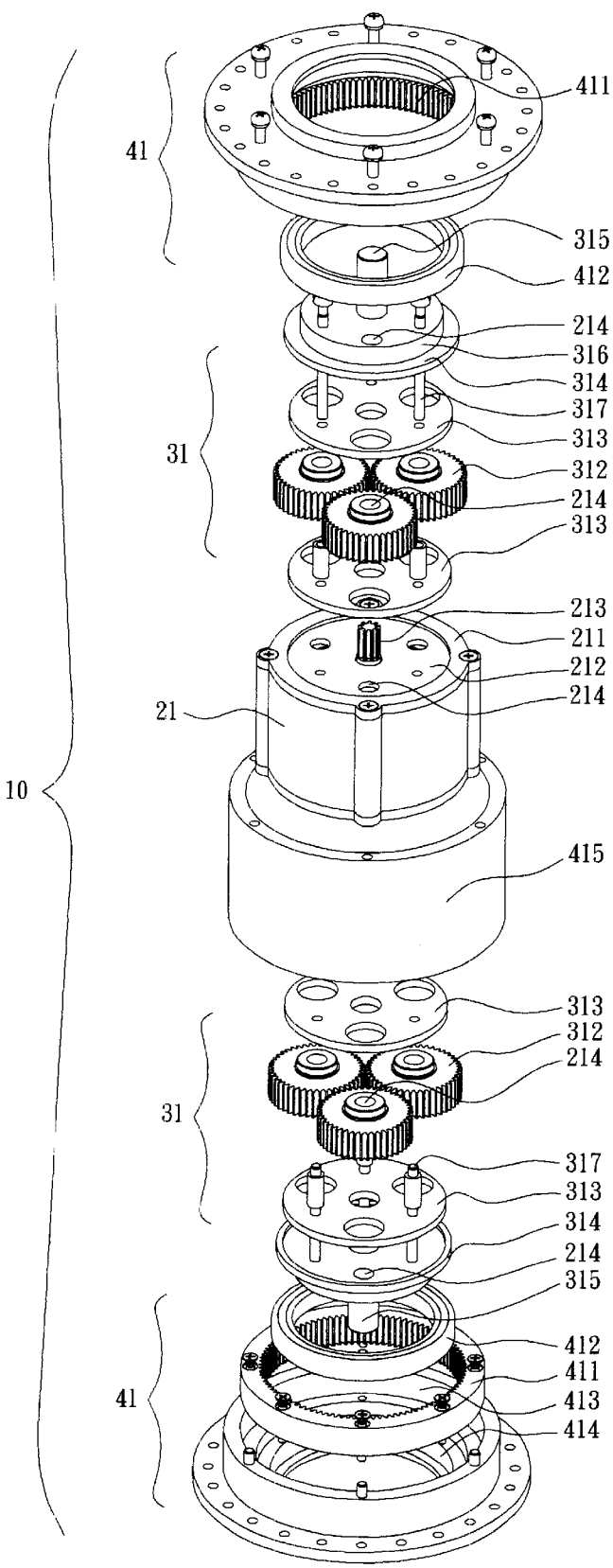
FIG. 1 is the exploded view of the first preferred embodiment of the invention.

With reference now to FIGS. 1 to 6, the drum-type motor 10 of the present invention comprises a spindle motor 21. The spindle motor 21 has a torque-outputting shaft on one lateral side thereof and is functioned as a sun gear 213 of the drum-type motor 10. The spindle motor 21 has two lateral sides 211 each having at least one concentric fixing end 212. The drum-type motor 10 of the present invention further comprises a planet gear set composed a plurality of gears 312. The center of each planet gear 312 has a motor-signal guiding hole 214. One side of the gear 312 is concentrically arranged on the concentric fixing end 212, another side of the gear 312 has an outward extended circular bump 316 with a circular plate 314. The outward extended circular bump 316 is concentrically engaged to the inner surface of a rotation bearing 412. The outward extended circular bump 316 further has an outward extended supporting shaft 315, which provides support for the drum-type motor 10. The sun gear 213 is passed through the center of the planet gear set. The drum-type motor 10 has lateral side 41 with an inner concave circle 414 and an outer concave circle 413 concentric to the inner concave circle 414. The drum-type motor 10 has an inner gear 411 concentrically fixed within the outer concave circle 413 and the inner concave circle 414 housing the outer circle of the rotation bearing 412. The inner gear 411 is engaged to the outer tooth of the planet gear 312, thus magnifying the torque provided by the spindle motor 21 through the sun gear 213.

Both sides 211 of the spindle motor 21 have extruding axes extruding from the spindle to function as the sun gears 213. The sun gears 213 are engaged to the teeth of the planet gear sets on the two lateral sides 211. The planet gear sets on the two lateral sides 211 are engaged to the inner gear 411.

The torque of the spindle motor 21 is magnified through the tooth ratio of the sun gear 213 and the inner gear 411. Afterward, the inner gear 411 drives the drum shell 415 to output the torque.

Figure 5:
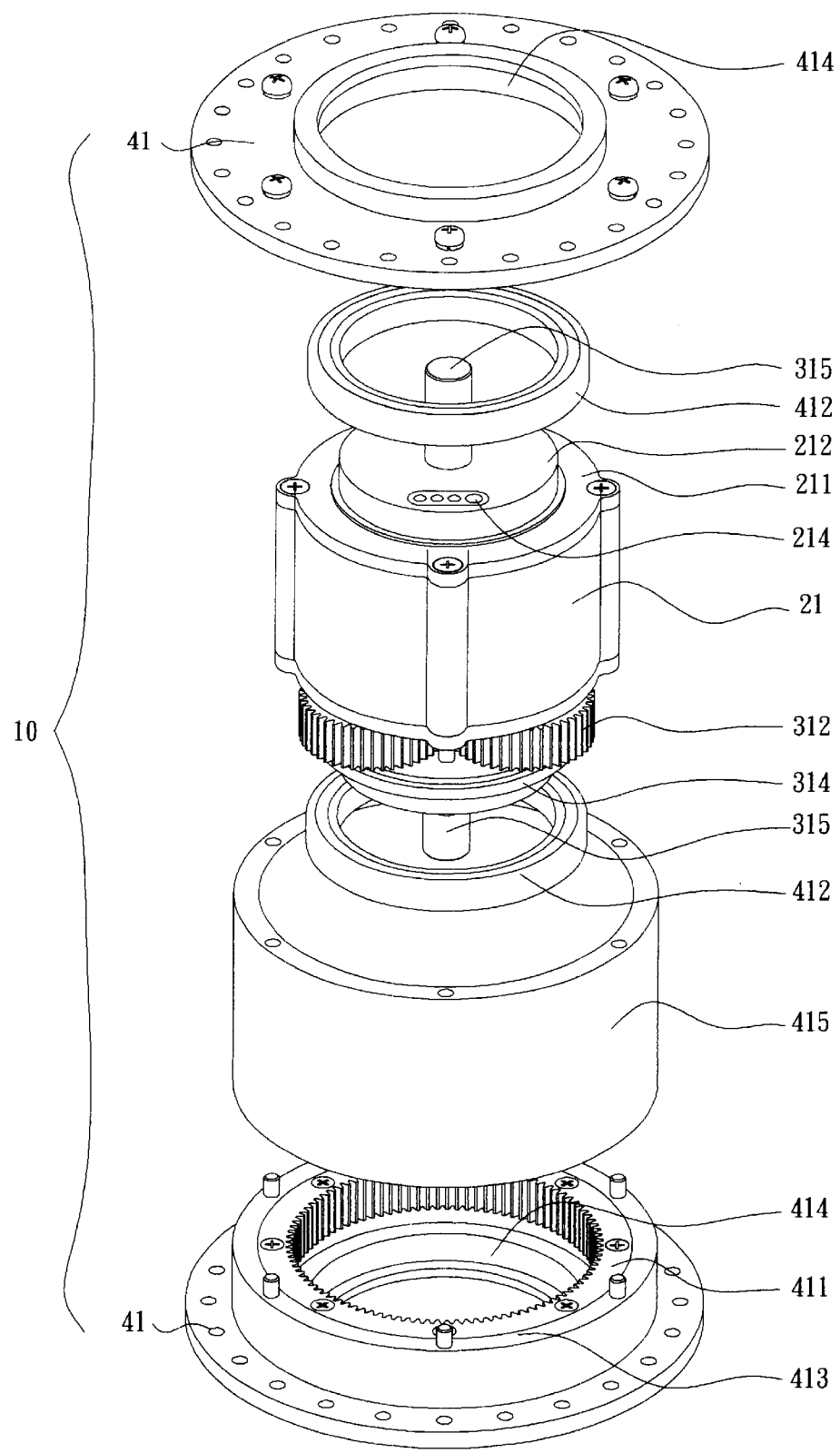
FIG. 5 is the exploded view of the second preferred embodiment of the invention.
Figure 6:
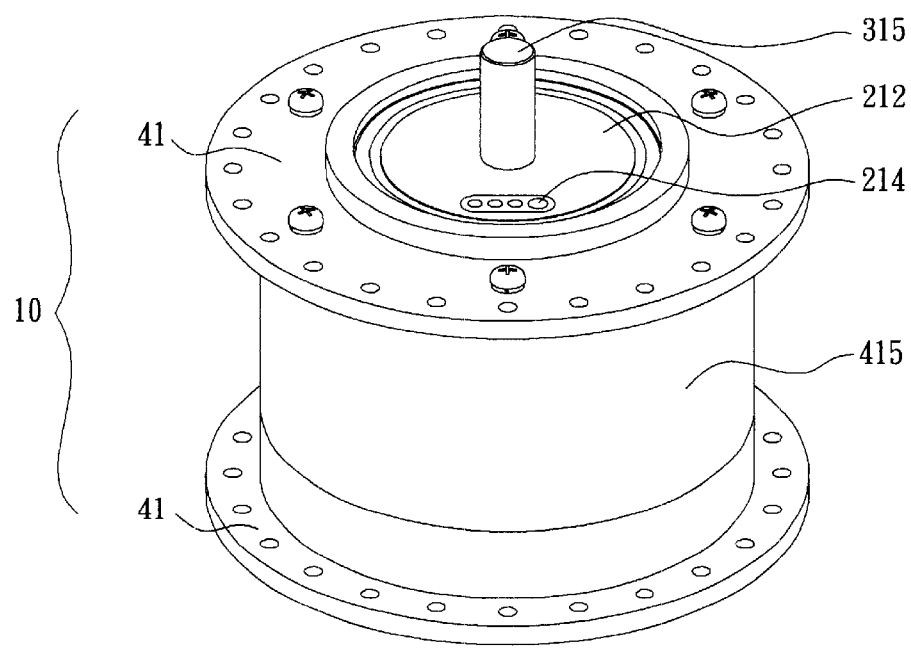
FIG. 6 is the perspective view of the second preferred embodiment of the invention.
Figure 6A:
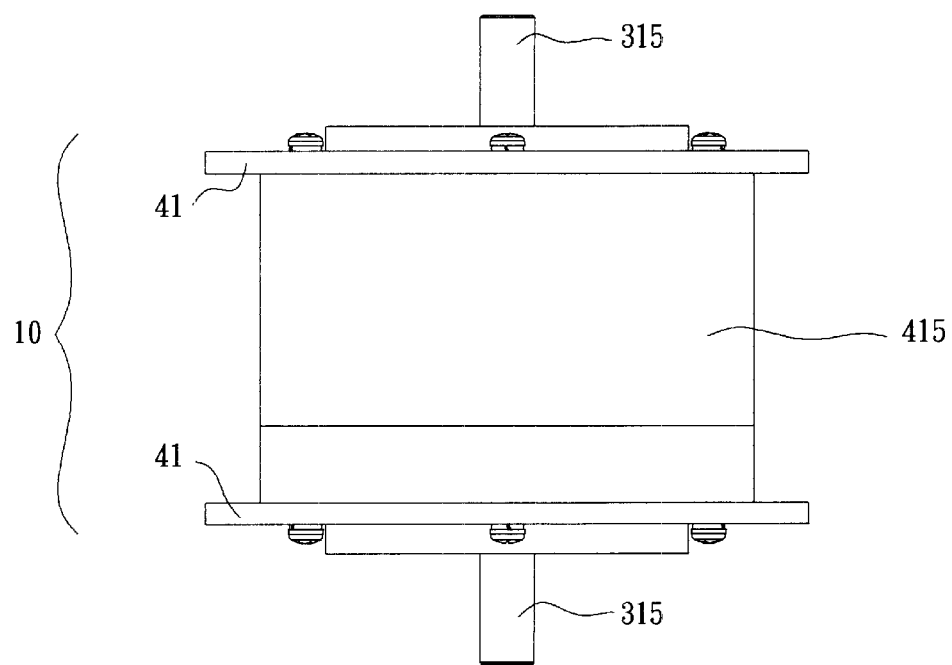
FIG. 6A is the sectional view of the second preferred embodiment of the invention.
Figure 7:
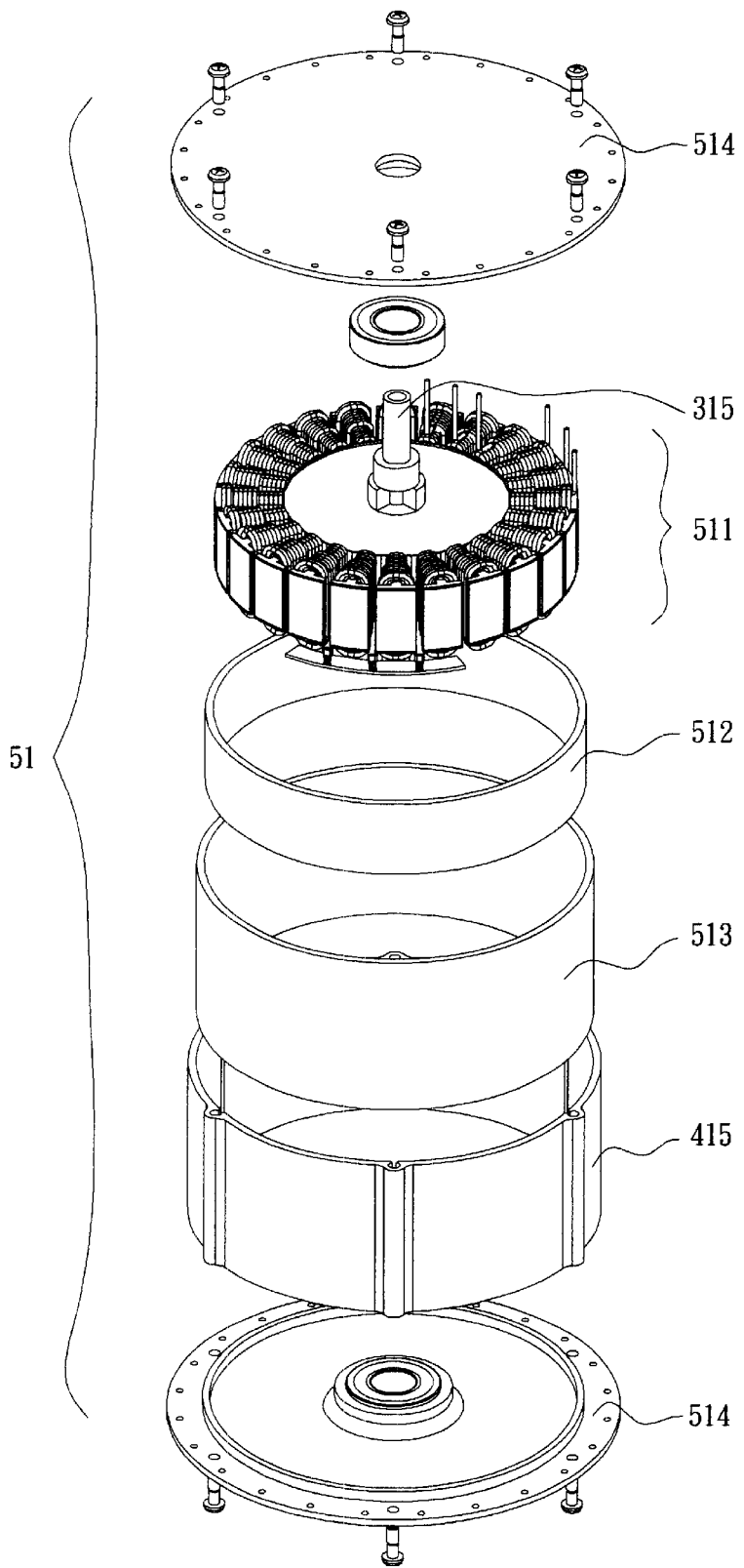
FIG. 7 is the exploded view of prior art outer-rotor drum-type motor.

As shown in FIGS. 5, 6 and 6A, the spindle motor 21 has only one axis extruding from one lateral side 211 thereof and functioned as sun gear 213. The sun gear 213 is engaged to the tooth of the planet gear set on the lateral side 211. The planet gear set on the lateral side 211 is engaged to the inner gear 411. The torque of the spindle motor 21 is magnified through the tooth ratio of the sun gear 213 and the inner gear 411. Afterward, the inner gear 411 drives the drum shell 415 to output the torque.

Figure 2:
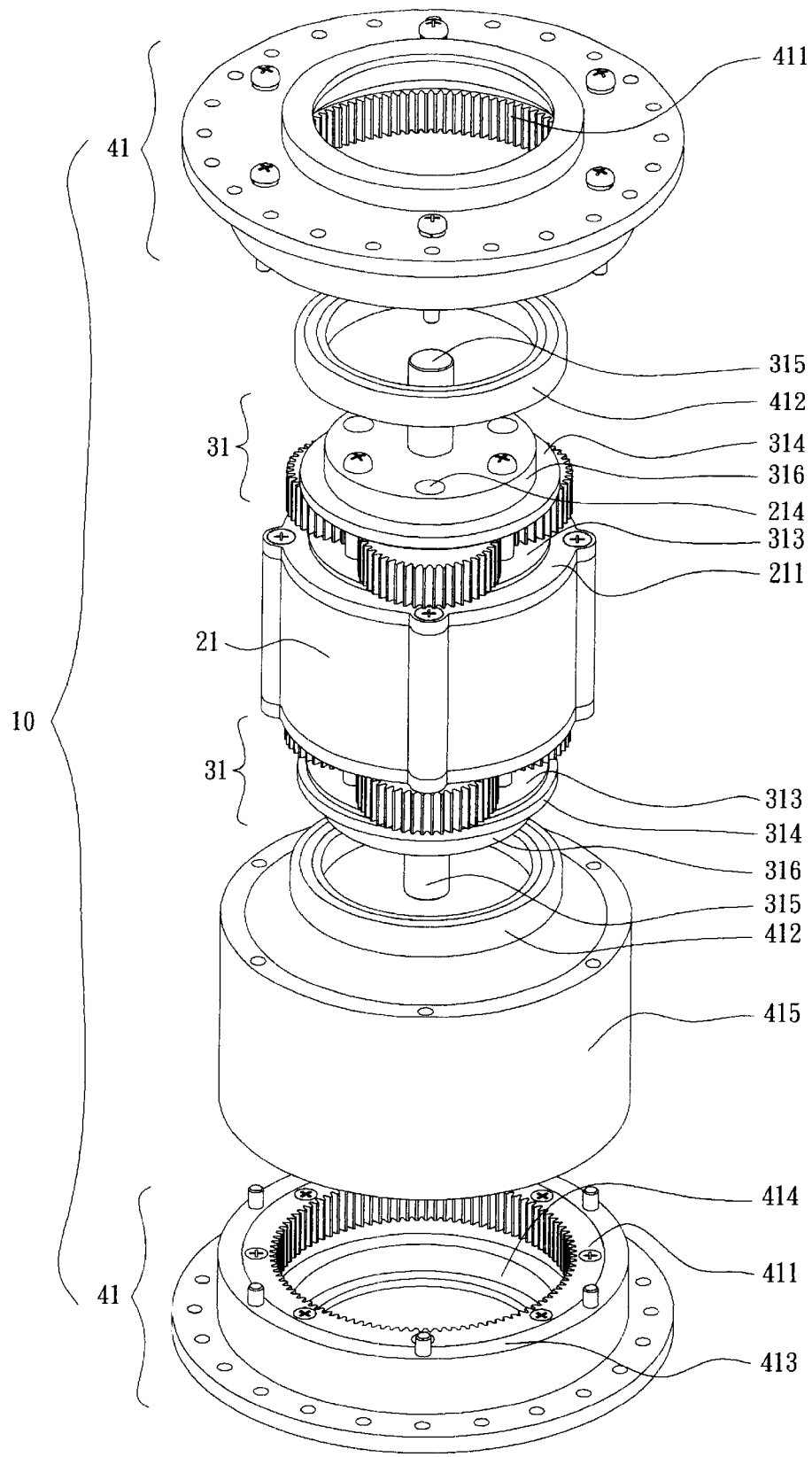
FIG. 2 is the exploded view of the first preferred embodiment of the invention, wherein the planet gear set has side plate.

As shown in FIGS. 1 and 2, the planet gear 312 of the planet gear set 32 is clamped by a side plate 313 to the lateral side 211 of the spindle motor 21, The side plate 313 is screwed by screws 317 to the lateral side 211.

Figure 3:
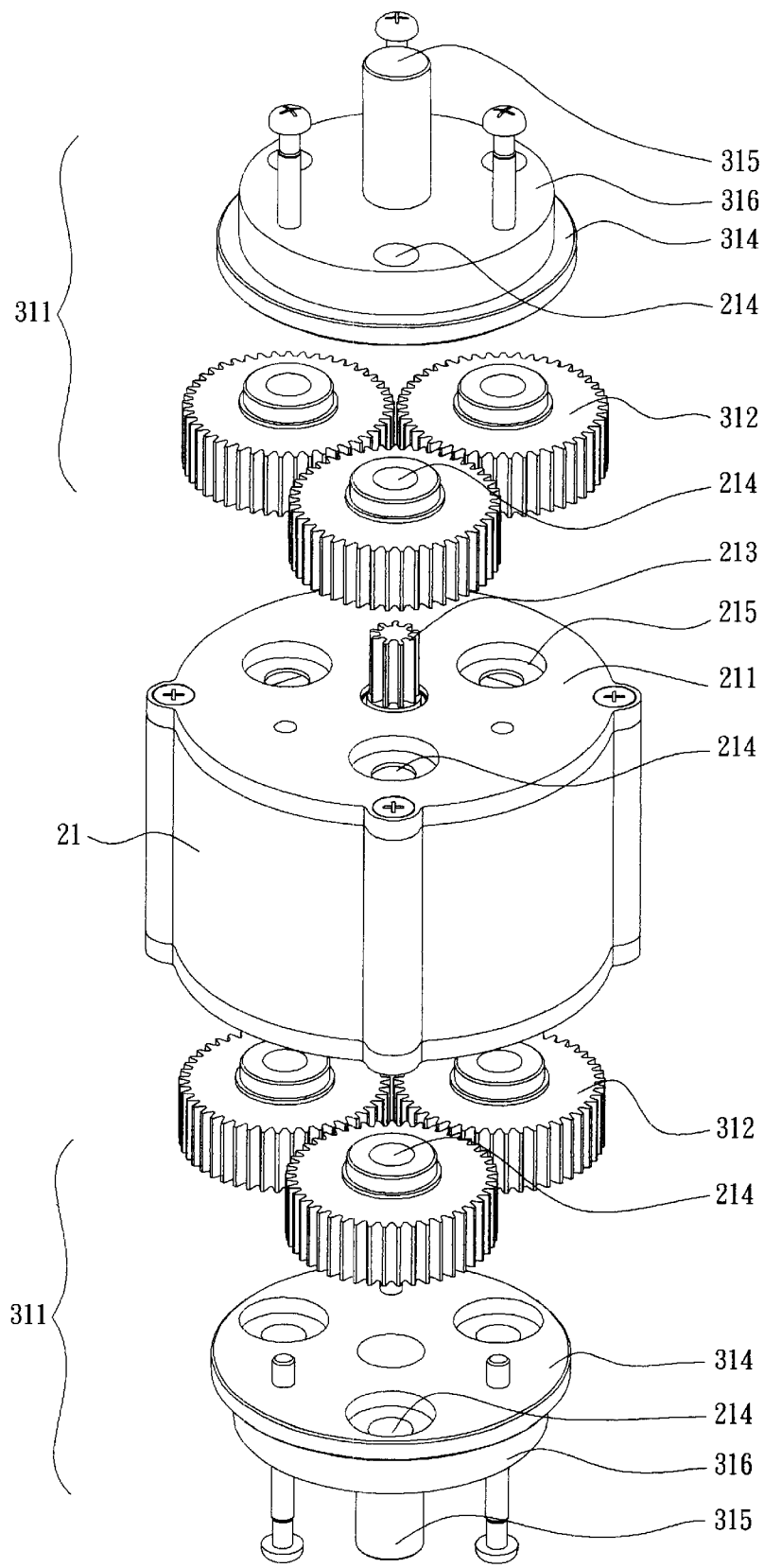
FIG. 3 is the exploded view of the first preferred embodiment of the invention, wherein the planet gear set has not side plate.
Figure 4:
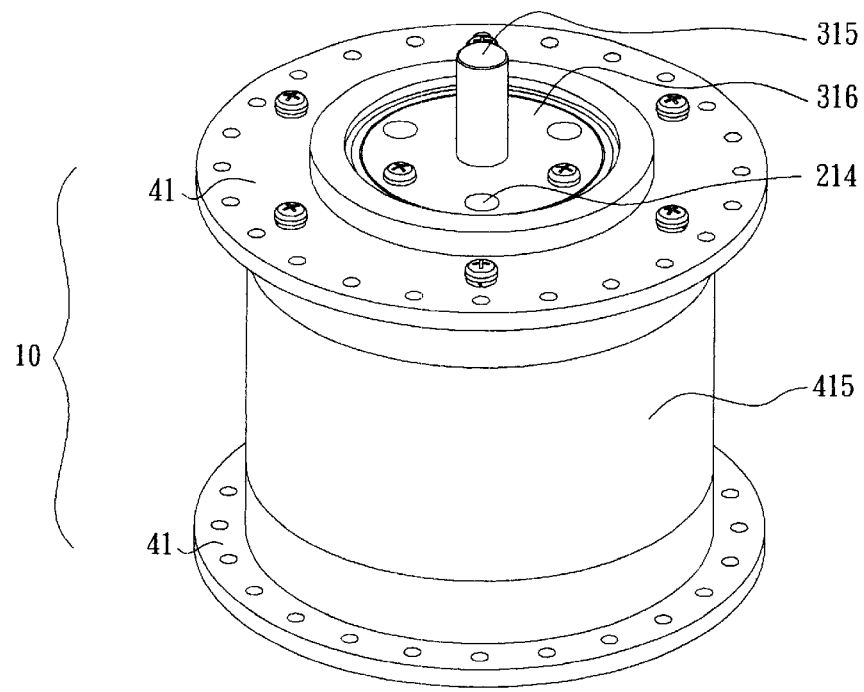
FIG. 4 is the perspective view of the first preferred embodiment of the invention.
Figure 4A:
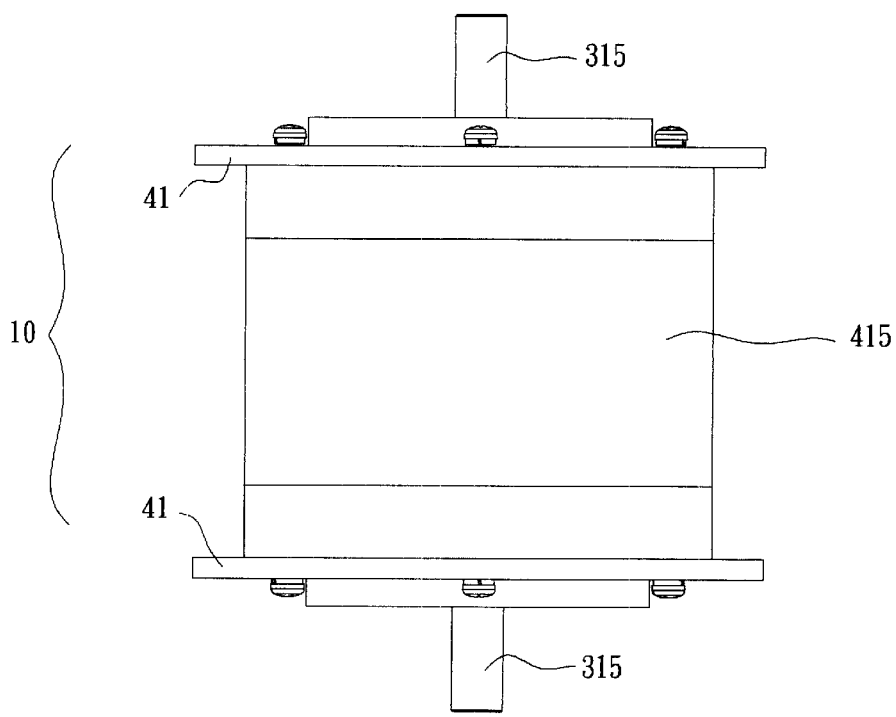
FIG. 4A is the sectional view of the first preferred embodiment of the invention.

As shown in FIG. 3, when the planet gear set 311 has no side plate, the planet gear 312 of the planet gear set 311 is clamped by circular hole 215 on the lateral side 211.

The extruding axis of the motor 21 can be directly lathed to form the sun gear 213, alternatively the spin axis of the motor 21 can be separately formed and assembled to the center of the sun gear 213.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A drum-type motor with inner gear, comprising
a spindle motor having two lateral sides, and a spin axis provided on each lateral side thereof and functioning as a sun gear; the spindle motor having at least concentric fixing part on each lateral side thereof;
a planet gear set composed of a plurality of planet gears; one side of the planet gear fixed to one concentric fixing part; another side of the gear having an outward extended circular bump, which is concentrically engaged to the inner surface of a rotation bearing; the circular bump having an outward extended supporting shaft, which provides support for the drum-type motor; the sun gear passed through the center of the planet gear set and the sun gear engaged with the planet gears;
the drum-type motor having a lateral side with an inner concave circle and an outer concave circle concentric to the inner concave circle; the drum-type motor having an inner gear concentrically fixed within the outer concave circle and the inner concave circle housing the outer circle of the rotation bearing such that the inner gear is engaged to the outer tooth of the planet gear, thus magnifying the torque provided by the spindle motor through the sun gear.

2. The drum-type motor with inner gear as in claim 1, wherein both sides of the spindle motor have extruding axes extruding from the spindle to function as the sun gears; the sun gears engaged to the teeth of the planet gear sets on the two lateral sides; the planet gear sets on the two lateral sides engaged to the inner gear; the torque of the spindle motor magnified through the tooth ratio of the sun gear and the inner gear; the inner gear driving a drum shell of the drum-type motor to output the torque.

3. The drum-type motor with inner gear as in claim 1, wherein one side of the spindle motor has an extruding axis extruding from the spindle to function as the sun gear; the sun gear engaged to the teeth of the planet gear sets on one lateral side; the planet gear engaged to the inner gear; the torque of the spindle motor magnified through the tooth ratio of the sun gear and the inner gear; the inner gear driving a drum shell of the drum-type motor to output the torque.

4. The drum-type motor with inner gear as in claim 1, wherein the planet gear of the planet gear set is clamped by a side plate to the lateral side of the spindle motor.

5. The drum-type motor with inner gear as in claim 1, wherein for the planet gear without side plate, the planet gear of the planet gear set is clamped by circular hole on the lateral side.

6. The drum-type motor with inner gear as in claim 1, wherein the extruding axis of the motor is directly lathed to form the sun gear.

7. The drum-type motor with inner gear as in claim 1, wherein the axis of the motor is separately formed and assembled to the center of the sun gear.

* * * * *